United States Patent [19]

Jones et al.

[11] 4,317,398
[45] Mar. 2, 1982

[54] SAWMILL APPARATUS HAVING CANT SUPPORTING MEANS

[75] Inventors: Aaron U. Jones, Eugene, Oreg.; Marcel R. Trudeau, deceased, late of Eugene, Oreg.; by Claire Trudeau, administratrix, Ville St-Pierre, Canada

[73] Assignee: Seneca Sawmill Company, Eugene, Oreg.

[21] Appl. No.: 134,442

[22] Filed: Mar. 27, 1980

[51] Int. Cl.³ ............... B27B 13/00; B27B 29/08; B27B 31/08
[52] U.S. Cl. ............................. 83/156; 83/157; 83/425.2; 83/435.1; 83/708; 83/808
[58] Field of Search ............ 83/156, 157, 708, 435.1, 83/808, 436, 425.2, 425

[56] References Cited

U.S. PATENT DOCUMENTS

| | | | |
|---|---|---|---|
| 524,136 | 8/1894 | Edgar | 83/156 |
| 618,653 | 1/1899 | Farr | 83/156 |
| 693,809 | 2/1902 | Thomas | 83/156 |
| 767,397 | 8/1904 | Fairfield | 83/425.2 |
| 1,381,183 | 6/1921 | Gray | 83/708 X |
| 1,567,289 | 12/1925 | Munroe | 83/425.2 X |
| 3,786,712 | 1/1974 | Mackin | 83/435.1 X |
| 3,863,530 | 2/1975 | Weidman | 83/436 X |
| 4,206,673 | 6/1980 | Detjen | 83/425.2 X |

*Primary Examiner*—Frank T. Yost
*Attorney, Agent, or Firm*—John P. Dellett

[57] ABSTRACT

A sawmill apparatus includes first and second carriages for supporting first and second logging dogs therebeneath, with the second carriage being movable upon the first whereby to engage the ends of a log between the dogs. The carriages support the dogs at the end of steel baldes which are moved in a vertical direction by a combination of air cylinders and ball screws to provide the desired positioning of the log in a vertical direction. As the carriages urge the log between the blades of a bandsaw, rubber tired wheels are raised against the underside of the log for supporting cants or boards sawn therefrom and preventing splitting at the finally sawn edge.

23 Claims, 5 Drawing Figures

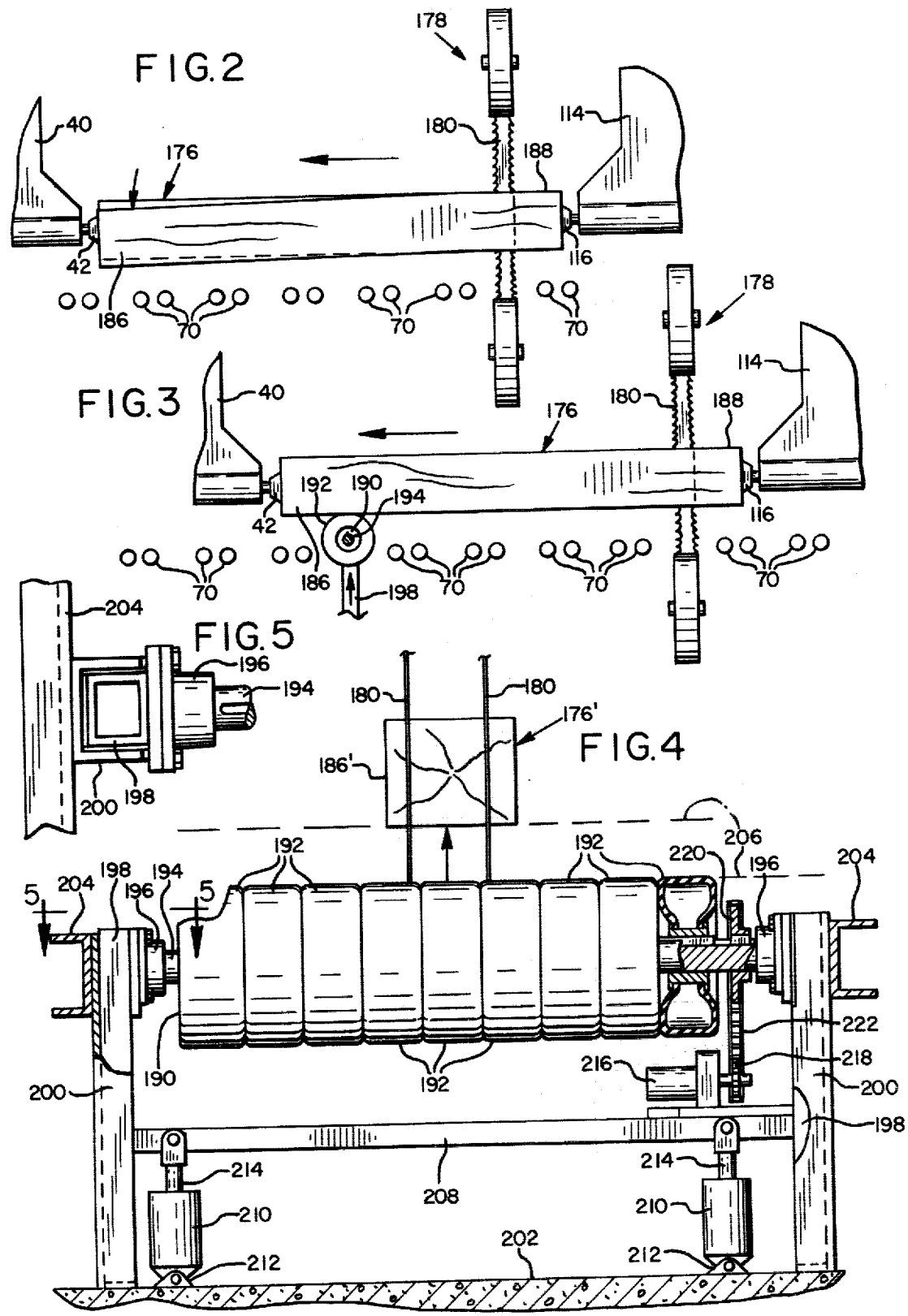

SAWMILL APPARATUS HAVING CANT SUPPORTING MEANS

BACKGROUND OF THE INVENTION

The present invention relates to sawmill apparatus provided with log supporting means and particularly to means for supporting boards or cants sawn from a log to prevent splitting or damage where the board or cant is finally separated from the log.

In a sawmill apparatus a log or cant is driven through stationary bandsaws by means of a carriage apparatus which engages the log or cant centrally on either end. The carriage may take more than one pass through the bandsaws, and may rotate the log between passes for sawing in perpendicular directions. The cants or boards removed from the main cant or log are dropped onto an outfeed conveyor located below the path of the carriage apparatus and by means of which severed material is conveyed to resaw apparatus or the like for sawing the boards or cants into dimensioned lumber. Although it is possible to provide a carriage construction to reduce the vertical drop of cants or boards after being sawn, nevertheless, as a cant or board is being sawn, substantially the only support therefor is the common or unsawn region where the cant or board is still joined to the log. Toward the end of the carriage stroke, only a narrow region joins the cant or board to the log, and the rest of the cant or board hangs in cantilever fashion exerting a considerable moment at the unsawn end until the cant may split off, leaving a jagged edge or break rather than a sawn edge. Of course, this jagged edge lowers the quality of the lumber and may affect the length of a board which can be provided from a given log if the end has to be resawn.

SUMMARY OF THE INVENTION

According to the present invention in a preferred embodiment thereof, a sawmill apparatus including a log carriage and a saw is provided with means for engaging the underside of a log or cant after the log or cant is engaged by the carriage whereby to support boards or cants sawn from the log. The means for engaging the underside of the log preferably comprises compliant, rotatable means, suitably taking the form of one or more wheels each including a pneumatic tire formed of rubber or other elastomeric material. Each wheel is rotated at a speed commensurate with the speed of movement of the log through the saw, and is urged against the underside of the log after the same has passed through the saw, in supporting relation to boards or cants sawn from the log. After severing is complete, the wheel or wheels are suitably lowered, whereby the severed board or cant may be delivered to an outfeed conveyor means.

Preferably, the compliant, rotatable means comprises a plurality of rotatable members spaced at points along the path of the log, wherein each rotatable member includes several wheels having elastomeric tires. The rotatable members are disposed on both sides of the fixed saw in the instance where a log is driven through a saw in both forward and reverse cutting directions.

It is accordingly an object of the present invention to provide an improved sawmill apparatus capable of providing lumber of improved quality.

It is another object of the present invention to provide an improved sawmill apparatus wherein damage to boards and cants sawn from a cant or log is prevented.

It is another object of the present invention to provide an improved sawmill apparatus having compliant conveyor means in close relation to a log or cant being sawn.

The subject matter which we regard as our invention is particularly pointed out and distinctly claimed in the concluding portion of this specification. The invention, however, both as to oganization and method of operation, together with further advantages and objects thereof, may best be understood by reference to the following description taken in connection with the accompanying drawings wherein like reference characters refer to like elements.

DRAWINGS

FIG. 2 is a schematic illustration depicting a prior art problem;

Figure 1:
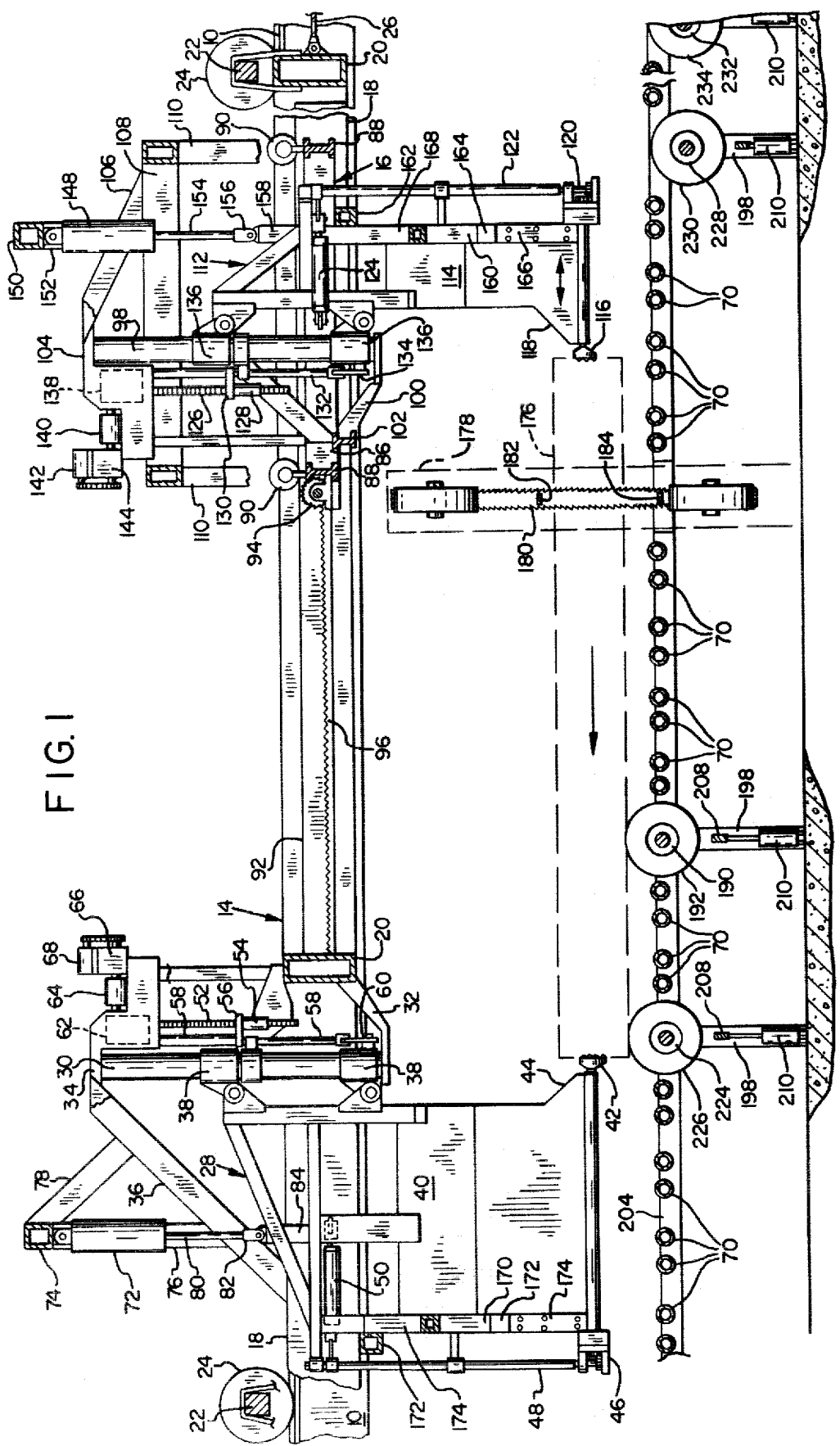
FIG. 1 is a side view, partially broken away and partially in cross section, of a sawmill apparatus according to the present invention.

FIG. 3 schematically illustrates an embodiment of the present invention;

FIG. 4 is a vertical cross section of a rotatable member according to the present invention; and FIG. 5 is a partially broken away view taken at 5—5 in FIG. 4.

DETAILED DESCRIPTION

Referring to the drawings, and particularly to FIG. 1, a pair of parallel steel rails 10 (only one of which is shown) bear a system of carriages comprising a larger or outer carriage 14 supporting an inner carriage 16, each of said carriages carrying a log engaging member. The first or outer carriage comprises rectangular side beams 18 joined by rectangular cross beams 20 at spaced points therealong. At the end extremities of the first carriage, cross beams 20 are attached to cross supports 22 having means for journaling stub shafts of wheels 24 which ride upon rails 10. The carriage may be moved along the rails by means of cable 26 and a similar cable (not shown) at the opposite end of the carriage.

Supported from the first carriage 14 is a frame 28 for carrying a first log engaging member. In particular, a first vertical column 30 is disposed between a lower support member 32, secured to a cross beam 20, and a top support 34. Diagonal braces 36 extend downwardly from the top support and are secured to the beams 18 and 20. Upper and lower cylindrical bearing members 38 are slidably received on column 30 and are pivotally connected to brackets welded to a frame 28, the pivotal connections acting to prevent binding as the bearing members slide up and down on the columns. The frame 28 carries blade 40 of a first log engaging member, it being noted the blade 40 is positioned in alignment with the direction of movement of the carriage 14, i.e. in a direction parallel to rails 10.

Blade 40 is provided at its lower forward end with a rotatable dog 42, the blade 40 being canted forwardly at 44 to place dog 42 substantially directly under the center of column 30. The rearward end of the dog shaft is driven through gearing 46 by vertical shaft 48, the upper end of which is rotatable by means of hydraulic cylinder 50. Dog 42 can be rotated through ninety degrees for similarly rotating a log engaged whereby a second saw cut can be made in perpendicular relation to a first saw cut.

The first log engaging member including blade 40 and dog 42 is vertically adjustable for vertically positioning a log, and this vertical adjustment is brought about with a vertical ball screw 52 threadably engaging ball bearings in cooperating member 54, the latter having a bracket 56 positioned under a shoulder on a guide rod 58 disposed in parallel relation to the ball screw. The guide rod is attached via flexible connection 60 to lower bearing member 38.

Ball screw 52 is rotated by means of right angle reduction gearing 62 operated by motor 64. Motor 64 also turns reduction gearing 66 for rotating encoder 68 adapted to indicate and control the extent of rotation of the ball screw. As will be noted, rotation of the ball screw operates to raise and lower bearing member 38 via guide rod 58, and therefore predetermined rotation of the ball screw is adapted to position the log engaging member at a desired vertical height above live rollers 70 of underlying conveyor means.

Also functioning to raise and lower the log engaging member is an air cylinder 72 pivotally supported from underneath a cross arm 74 attached to the first carriage by means of vertical members 76 extending downwardly to diagonal braces 36, and by means of diagonal arms 78 also secured to diagonal braces 36. Actuating rod 80 concludes in a clevis 82 for attaching the actuating rod to an arm 84 extending upwardly from the approximate center of frame 28. For lifting the quite heavy blade 40, typically formed of steel plate, a regulated high air pressure is applied to air cylinder 72 via a conventional air regulator (not shown) whereby actuating rod 80 moves blade 40 upwardly and prevents binding and undue stress on ball screw 52. When ball screw 52 has turned by a desired amount and the log engaging member has raised to the extent desired as gauged by encoder 68, the ball screw motor 64 is no longer energized and a lower pressure is applied to air cylinder 72. For lowering the log engaging member, a lower pressure is maintained in air cylinder 72 whereby the log engaging member is lowered under the control of the ball screw. The ball screw and air cylinder thus cooperate in raising and lowering the log engaging member accurately without undue stress.

The second or inner carriage 16 comprises longitudinal I-beams 86 joined by cross beams 88 at either end thereof. Carriage wheels 90 are rotatable on stub shafts secured upwardly from the four corners of the second carriage and these wheels travel along rails 92 respectively secured within side beams 18 of the first carriage. The second carriage is propelled by motor means (not shown) rotating pinions 94 which engage racks 96 attached adjacent the inside of rails 92. The log engaging member supported by carriage 16 can thus be moved relative to the log engaging member supported by carriage 14, e.g. for the purpose of engaging a log.

The second carriage includes a column 98 positioned between a lower support member 100, attached to a cross I-beam 102 located underneath the second carriage, and a top support 104. Diagonal arms 106 extend downwardly from the top support toward upper horizontal members 108 forming part of an upper framework joined to the lower part of the second carriage by means of vertical end members 110.

A supporting frame 112 carries a second log engaging member including blade 114 which is disposed in aligned relation with the direction of movement of carriage 16. Blade 114 is somewhat shorter than blade 148 and is provided at its lower forward end with a log engaging dog 116, the blade 114 and dog 116 being canted forwardly as indicated at 118 to position the dog 116 approximately centrally under column 98. The opposite end of the shaft for dog 116 cooperates with gearing 120 driven in ninety degree relation via shaft 122 rotatable by means of hydraulic cylinder 124. Cylinder 124 is operated for orienting the dog 116 in two different, approximately perpendicular positions. The log can be thereby oriented in one position for one pass through a saw, and then turned ninety degrees for sawing in a perpendicular direction.

For vertically adjusting the position of the log engaging means including blade 114 and dog 116, the second carriage is provided with a ball screw 126 having a threaded connection with ball bearings in cooperating member 128 having a bracket 130 positioned under a shoulder of guide rod 132 disposed in parallel relation to ball screw 126. The lower end of guide rod 132 is attached via flexible connection 134 to the lower one of two bearing members 136 slidably received on column 98. Ball screw 126 is rotated by way of right angle reduction gearing 138 driven with motor 140, the said motor also driving encoder 142 through reduction gearing 144 to provide an indication of the extent of rotation of the ball screw for controlling the same.

In conjunction with the ball screw, the second log engaging member is moved in a vertical direction by an air cylinder 148 connected to cross arm 150 supported above the second carriage with vertical members 152 extending to diagonal arms 106. The actuating rod 154 of air cylinder 148 concludes in a clevis 156 pivotally joined to an upright 158 extending upwardly from supporting frame 112 in approximate alignment with the rear end of blade 114. For raising the frame 112, and the log engaging member supported thereby, a regulated high pressure is applied to air cylinder 148 while ball screw 126 is rotated in the desired direction by motor 140 such that substantial stress is taken off the ball screw. When the desired vertical position is reached in upraising the log engaging member, rotation of the ball screw is concluded and the air pressure to cylinder 148 is reduced. In lowering the log engaging member, a predetermined lower pressure is applied to air cylinder 148 and the ball screw is rotated in the opposite direction. The log engaging members can thus be raised and lowered relative to the conveyor comprising rollers 70.

Each of the blades 40 and 114 is provided with side braces mounted on respective carriages and extending downwardly on each side of each blade for maintaining correct horizontal positioning by preventing side sway of the respective blades in the lateral direction of the apparatus. First considering blade 114, angular side braces 160 extend downwardly from side beams 86 and lateral beam 162 disposed between beams 86 for holding pads 164 against the bearing plates 166 which are joined to the blade for maintaining proper blade alignment while permitting slidable movement between the pads and the bearing plate. Vertical supports 168 also extend downwardly from the lateral beam in securing relation to pads 164. It will be seen that the blade 114 and the dog 116 carried thereby will be constrained to an aligned path along the direction of movement of carriage 16 without substantial turning or side play.

Also, angular side braces 170 hold pads 172 against bearing plates 174 secured to blade 40 of the first log engaging member. The angular braces 170 are attached to lateral beam 172 forming part of the first carriage, while vertical supports 174 also extend downwardly from the lateral beam in securing relation to pads 172. Thus, blade 40 and dog 42 carried thereby are maintained in proper alignment with the direction of movement of the first carriage.

The sawmill apparatus is adapted to engage ends of a log 176 for carrying the log through a bandsaw apparatus indicated at 178 in FIG. 1. The bandsaw apparatus comprises a pair of bandsaws driving blades 180 (one of which is illustrated in FIG. 1), each having saw teeth on both their forward and rearward edges and each being provided with upper and lower saw guides 182 and 184. The top saw guide is suitably adjustable in vertical position according to the diameter of the log. The bandsaw blades 180 may be positioned in relatively close spaced relation, and the blades 40 and 114 carrying the respective dogs 42 and 116 are adapted to pass between the saw blades while the log is cut into boards or cants as desired. The bandsaws are adapted to move toward and away from one another in a conventional manner whereby varying cuts may be made depending upon the size of the log and the direction the same is passing through the bandsaws. A log may be carried through the bandsaws in a first direction, while the bands are more widely spaced, after which the bands are positioned closer to one another and the direction of log movement reversed for taking a second cut. Alternatively, the log may be rotated by simultaneously turning shafts 48 and 122 after a first cut for making a second cut in ninety degree relation to the first.

The described apparatus has the advantage of providing vertical log movement whereby the cants or boards cut from the log do not have to drop a great distance onto the conveyor comprising rollers 70 after being severed from the log, resulting in decreased damage to the cut lumber. The dogs are moved simultaneously in a vertical direction through joint operation of both said air cylinders and both said ball screws so the dogs can engage the log ends near the center, and after the log is engaged the dogs may be positioned as appropriate through joint operation of both air cylinders and both ball screws so the log will be at a predetermined level.

Despite the aforementioned advantages of this disclosed construction wherein the severed cants or boards do not have far to drop, the cants or boards are still subject to damage because of the problem illustrated in FIG. 2. As log 176 is carried through the bandsaws between dogs 42 and 116, for example in a direction from right to left in FIG. 2, a cant 186 is severed from the forward side thereof. As the log moves farther to the left, and the remaining connection holding the cant to the log becomes a narrower and narrower, the cant 186, hanging cantilever fashion, exerts a considerable moment at end 188 of the log until the cant actually splits off, leaving a jagged edge or break rather than a sawn edge.

In accordance with the present invention this situation is corrected, as illustrated in FIG. 3, by providing flexible support for the cants or boards sawn from a log until they can be finally sawn completely to the end without breaking. In particular, flexible support is supplied by compliant rotatable means desirably comprising one or more wheels 190 each including a pneumatic tire 192, said tire being formed of rubber or other elastomeric material. The wheels are disposed along the path of the carriages and have a horizontal axis of rotation transverse to the carriage path. The tires engage the underside of the log, being urged upwardly thereagainst after the log has been engaged by the carriage and after the log passes through or has started to pass through the saw, for thereby supporting cants or boards removed from the log.

As will be observed in FIG. 3, the level of the tire contacting log 176 is above the level of live rolls 70 during sawing. However, after the cant 186 is completely severed from the log, the wheel is dropped downwardly whereby cant 186 may be removed to the left through operation of rolls 70.

Referring more particularly to FIG. 4, illustrating a preferred embodiment of rotatable means according to the present invention in vertical cross section, a rotatable member includes a set of wheels 190 provided with tires 192 extending transversely across the path of a log or cant 176' sawn by bandsaw blades 180. In the embodiment, nine wheels 190 are keyed for rotation on a common shaft 194 journaled between bearings 196 respectively affixed near the top of vertical columns 198. Columns 198 are slidable with respect to yokes 200 which guide the columns for vertical movement. In the downward position, the columns 198 rest on concrete floor 202 at which time the tops of columns 198 are adjacent the top edges of channels 204 forming a rollcase frame for live rolls 70. The tops of tires 192 in this downward position are adjacent or just below the top level 206 of the live rolls.

Below tires 192, a horizontal member or beam 208 extends between the columns 198, being attached to each said column in supporting relation. Actuator means comprising air cylinders 210 are mounted adjacent each column on floor 202 by means of pivotal supports 212, and each air cylinder has a vertically upwardly extending actuating rod 214 which is pivotally connected to horizontal beam 208. Simultaneous operation of air cylinders 210 raises horizontal beam 208 as well as vertical beams 198 joined thereto for bringing the peripheries of tires 192 against a lower side of a log or cant 176'. The air cylinders 210 are actuated after the log or cant 176' passes through the bandsaw blades 180 and the forward moving end thereof is located above wheels 190. The air pressure applied is sufficient to provide firm support under the log or cant whereby further cant 186' will not hang down and berak off, but insufficient pressure is supplied as would dislodge the log or cant 176' from between the carriage dogs.

As will be noted, the wheels 190 extend substantially completely across the carriage path and under the logs or cants carried thereby, or substantially across the full width of the roll case between channel members 204. Therefore, cants of various sizes can be adequately supported during respective passes through the bandsaws.

A hydraulic motor 216 is further mounted on horizontal beam 208, said hydraulic motor having a sprocket 218 for driving a sprocket 220 via drive chain 222, sprocket 220 being keyed to shaft 194. The wheels are driven to impart a peripheral speed to the tires matching or slightly greater than and in the same direction as translation of the log or cant they are intended to contact. Frictional engagement between the tires and the log or cant as the wheels are raised will cause the peripheral speed of the tires substantially to equal the translational speed of the log or cant.

Raising and lowering of the air cylinders is suitably accomplished by a manual control (not shown), raising being accomplished as soon as the operator observes the forward end of a log has passed over the position of the wheels 190. The wheels are subsequently lowered in the same manner. Thus, after the log has been sawn in a given pass through the bandsaw, the cylinders 210 are actuated to move the wheels downwardly for depositing the severed cants upon the live rolls of the outfeed conveyor.

Referring particularly to FIG. 1, in addition to rotatable means comprising wheels 190 and tires 192, further rotatable members are suitably provided along the path of the log or cant for engaging the underside thereof. An additional rotatable member comprising wheels 224 carrying tires 226 is disposed along the path of the log or cant, being spaced along said path on the remote side of the first rotatable member 190-192 from the saw 178. In particular, first rotatable member 190-192 is suitably located at a distance of about eleven feet from the bandsaw blades 180, while rotatable member 224-226 is positioned another six feet beyond member 190-192. In other respects, rotatable member 224-226 is substantially identical in construction as particularly illustrated in FIG. 4. Having two rotatable means for receiving a severed board or cant provides additional support and enables both ends of the board or cant to be lowered gently to the roll case without dropping the trailing or last-sawn end. Live rolls 70 are, of course, interspersed between and on both sides of each of the rotatable members.

As will be realized, since cants are sawn from the log for both directions of movement of the log through the bandsaws, additional support would be desirable on the opposite side of the saw from the first and second mentioned rotatable members. Accordingly, wheels 228 carrying tires 230 are positioned along the path of the log or cant at a location approximately eleven feet from the bandsaw blades, to the right thereof as illustrated in FIG. 1, while further rotatable member 232-234 is disposed another six feet farther to the right. In all other respects, except for the direction of rotation to match the peripheral velocity to the log or cant, the construction of the additional rotatable members is suitably identical to that already described.

The roller case comprising live or driven rollers 70 suitably extends in both directions from the bandsaw along the line of carriage travel. For transporting severed boards or cants in a perpendicular direction, roller chains (not shown) may be interspersed between rollers 70, with means being provided to raise the roller chains after a board or cant is delivered above such roller chains.

Although the outfeed conveyor system generally includes rollers 70 and possibly roller chains therebetween, it will be apparent that the rotatable members according to the present invention may themselves comprise an outfeed conveyor. Instead of dropping the rotatable members below the surface of rollers 70 after receiving a log or cant, the rotatable members are suitably dropped by a predetermined distance and then simply employed for transporting severed boards or cants generally along and under the direction of carriage travel. For this purpose, additional rotatable members beyond those shown in FIG. 1 may be utilized in place of the roller case, and if desired roller chains for changing the direction of board movement may be interspersed between rotatable members and raised appropriately to engage the boards. Alternatively, the rotatable members may be dropped below the level of waiting roller chains.

While we have shown and described preferred embodiments of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. In a sawmill having a log carriage for receiving a log and carrying the same in a path generally longitudinal thereof and a saw disposed in line with the path of said carriage for sawing boards or cants from said log, the improvement comprising means for engaging the underside of said log after said log is engaged by said carriage and as said log is being sawed by said saw for supporting boards or cants as still partially joined to said log to prevent damage thereto as said boards or cants are sawed from said log.

2. The apparatus according to claim 1 wherein said means for engaging the underside of said log comprises rotating wheel means.

3. The apparatus according to claim 1 wherein said means for engaging the underside of said log is disposed across the path of said log underneath said log.

4. In a sawmill having a log carriage for receiving a log and carrying the same in a path generally longitudinal thereof and a saw disposed in line with the path of said carriage for sawing boards or cants from said log, the improvement comprising compliant means for engaging the underside of said log, as said log is moved by said carriage, to suport boards or cants as still partially joined to said log to prevent damage thereto as said boards or cants are sawed from said log.

5. The apparatus according to claim 4 including means for urging said compliant means against the underside of said log after said log is engaged by said carriage.

6. The apparatus according to claim 4 wherein said compliant means for engaging the underside of said log is disposed across the path of said log underneath said log.

7. In a sawmill having a carriage provided with dogging means for receiving and engaging the ends of a log, said carriage being movable in a path substantially longitudinal of said log, and a saw disposed in line with the path of said carriage for sawing boards or cants from said log as said carriage moves relative to said saw,
the improvement comprising a rotatable member disposed along the path of said carriage and having a horizontal axis of rotation transverse to the path of said carriage, and means for positioning said rotatable member substantially immediately adjacent and underneath the path of said log for engaging the underside of said log during sawing thereof, said rotatable member being disposed along said path downstream of the location where said log is sawn by said saw in order to support boards and cants sawed from said log whereby to prevent damage to said boards or cants as they are sawed from said log.

8. In a sawmill having a carriage provided with dogging means for receiving and engaging the ends of a log, said carriage being movable in a path substantially longitudinal of said log, and a saw disposed in line with the path of said carriage for sawing boards or cants from said log as said carriage moves relative to said saw, the improvement comprising a rotatable member disposed along the path of said carriage and having a horizontal axis of rotation transverse to the path of said carriage, and means for positioning said rotatable member substantially immediately adjacent the path of said log for engaging the underside of said log after the same passes said saw to support boards and cants sawn from said log whereby to prevent damage to said boards or cants as they are sawn from said log, wherein said rotatable member comprises at least one wheel circumferentially formed of elastomeric material for engaging said log and said positioning means comprises actuator means for raising said wheel against the underside of said log after the same passes said saw.

9. The apparatus according to claim 8 including motor means for rotating said wheel at a speed such that its peripheral velocity is comparable to the linear velocity of said log passing through said saw.

10. The apparatus according to claim 8 wherein said wheel comprises a pneumatic tire.

11. The apparatus according to claim 8 wherein said actuator means comprise plural air cylinders.

12. The apparatus according to claim 8 wherein said rotatable member further includes a plurality of additional wheels coaxial with said one wheel.

13. The apparatus according to claim 12 including a common shaft for said wheels, said wheels being keyed to said shaft for common rotation, and motor means for rotating said shaft.

14. The apparatus according to claim 13 wherein said actuator means comprise a pair of air cylinders, one mounted proximate each end of said shaft, and actuable for raising said shaft and said wheels.

15. The apparatus according to claim 14 wherein said wheels include pneumatic tires for engaging the underside of said log.

16. The apparatus according to claim 14 including a column located adjacent each end of said shaft, a bearing means for said shaft affixed to each column, and a horizontal member below said shaft joining said columns, wherein said air cylinders are mounted adjacent said columns and are attached to said horizontal member for raising said horizontal member.

17. The apparatus according to claim 8 including an additional rotatable member disposed along the path of said carriage and having an axis of rotation transverse to the path of said carriage and means for positioning said additional rotatable member substantially immediately adjacent the path of said log for engaging the underside of said log after the same passes said saw for additionally supporting boards and cants sawn from said saw, said additional rotatable member being spaced along the path of said carriage on the remote side of the first mentioned rotatable member from said saw.

18. The apparatus according to claim 17 further including third and fourth rotatable members similarly positioned on the opposite side of said saw from the first and second mentioned rotatable members.

19. The apparatus according to claim 17 including an outfeed conveyor adapted to receive boards or cants sawn from said log, said outfeed conveyor comprising a plurality of live rolls having horizontal axes of rotation transverse to the path of said carriage, said rotatable members being interspersed between said live rolls and normally extending no higher than the top surface of said live rolls, wherein said positioning means raise said rotatable members to above the top surface of said rolls against the underside of said log after the log passes said saw and until said cants or boards are sawn after which said positioning means lower said rotatable members for delivering said cants or boards to said outfeed conveyor.

20. The apparatus according to claim 8 wherein said dogging means are movable in a vertical direction relative to said carriage for vertically adjusting the position of said log relative to said rotatable member.

21. The apparatus according to claim 20 further including conveyor means for receiving boards and cants from said rotatable member, said dogging means being vertically movable with respect to said conveyor means.

22. In a sawmill having a log carriage for receiving a log and carrying the same in a path generally longitudinal thereof and a saw disposed in line with the path of said carriage for sawing boards or cants from said log, the improvement comprising compliant means for engaging the underside of said log as said log is moved by said carriage to support boards or cants and prevent damage thereto as said boards or cants are sawed from said log, said compliant means comprising a plurality of pneumatic tires, and including means for urging said compliant means against the underside of said log after said log is engaged by said carriage, said means for urging comprising air cylinder means for raising said pneumatic tires against the underside of said log.

23. The apparatus according to claim 22 including means for rotating said tires in the direction of travel of said log.

* * * * *